(12) United States Patent
Cuce' et al.

(10) Patent No.: US 11,541,966 B2
(45) Date of Patent: Jan. 3, 2023

(54) ANCHORING DEVICE

(71) Applicant: SEARES S.R.L., Pisa (IT)

(72) Inventors: Giorgio Cuce', Leghorn (IT); Corrado Taviani, Fucecchio (IT); Alessandro Burchianti, Saline di Volterra (IT); Marco Bartalucci, Castelfranco di Sotto (IT)

(73) Assignee: SEARES S.R.L., Pisa (IT)

( * ) Notice: Subject to any disclaimer, the term of this patent is extended or adjusted under 35 U.S.C. 154(b) by 0 days.

(21) Appl. No.: 17/292,611

(22) PCT Filed: Nov. 11, 2019

(86) PCT No.: PCT/IB2019/059655
§ 371 (c)(1),
(2) Date: May 10, 2021

(87) PCT Pub. No.: WO2020/100003
PCT Pub. Date: May 22, 2020

(65) Prior Publication Data
US 2022/0001959 A1 Jan. 6, 2022

(30) Foreign Application Priority Data
Nov. 12, 2018 (IT) .......................... 102018000010258

(51) Int. Cl.
*B63B 21/04* (2006.01)
*F16F 9/19* (2006.01)
(Continued)

(52) U.S. Cl.
CPC .............. *B63B 21/04* (2013.01); *F16F 9/19* (2013.01); *F16F 15/027* (2013.01); *B63B 2021/005* (2013.01); *B63B 2021/008* (2013.01)

(58) Field of Classification Search
CPC ............ F16F 9/19; F16F 15/027; B63B 21/04
See application file for complete search history.

(56) References Cited

U.S. PATENT DOCUMENTS

| 4,454,800 | A | * | 6/1984 | Koepper | ................. F16F 9/504 91/392 |
| 5,657,840 | A | * | 8/1997 | Lizell | .................. B60G 17/018 188/266.5 |

(Continued)

FOREIGN PATENT DOCUMENTS

| DE | 102016225626 A1 | 6/2018 |
| EP | 0142996 A2 * | 5/1985 |

(Continued)

OTHER PUBLICATIONS

International Search Report and Written Opinion, dated Mar. 6, 2020.

*Primary Examiner* — Vishal R Sahni
(74) *Attorney, Agent, or Firm* — Vorys, Sater, Seymour and Pease LLP

(57) ABSTRACT

An anchoring device for anchoring a floating object to an anchor structure, including a first attachment suitable for being secured to the floating object; a second attachment for being secured to the anchor structure; a damping member for damping the relative motion between the attachments for securing the first attachment to the second attachment and including a slide chamber, a piston for sliding in the slide chamber according to a relative motion between the attachments and a damper for damping the sliding of the piston in the slide chamber; and a control unit including a measurement sensor for measuring the sliding of the piston; and a control board for varying the damping of the damper according to the sliding of the piston detected by the measurement sensor.

10 Claims, 3 Drawing Sheets

(51) Int. Cl.
*F16F 15/027* (2006.01)
*B63B 21/00* (2006.01)

(56) References Cited

U.S. PATENT DOCUMENTS

| | | | | |
|---|---|---|---|---|
| 9,273,750 B2* | 3/2016 | Cuce | ................... | F16F 13/007 |
| 2011/0084503 A1* | 4/2011 | Li | ..................... | B60G 17/019 |
| | | | | 290/1 R |
| 2018/0001968 A1* | 1/2018 | Perlman | ................ | B63B 21/00 |

FOREIGN PATENT DOCUMENTS

| | | | |
|---|---|---|---|
| EP | 2705272 | A2 | 3/2014 |
| JP | 2009243651 | A * | 10/2009 |
| WO | 9902889 | A1 | 1/1999 |
| WO | 2012156854 | A2 | 11/2012 |

* cited by examiner

ANCHORING DEVICE

This invention relates to an anchoring device of the type specified in the preamble of the first claim.

In particular, the invention relates to a device suitable for securing a floating object (such as a boat or a buoy) to an anchor structure that can be floating or attached to the ground. The anchoring device can thus be used to, for example, secure a boat to a floating or fixed quayside. It should be noted that for simplicity and clarity, the expression "anchoring device" also identifies a mooring device.

As is well known, in order to secure a boat or other floating object, avoiding unwanted movements with respect to a certain structure, it is possible to carry out anchoring operations, wherein anchors are used, or mooring/docking operations involving tying ropes to bitts.

Often, in order to give greater stability to the anchored structure, a mooring spring (also called a spring or compensator) is used. This consists of an elastic body that is fixed to a boat by means of a rope or chain and it protects the mooring from wave motion, guaranteeing greater comfort on board.

The mooring spring can be made of various materials, such as steel, rubber, or thermoplastic material.

The prior art described here comprises a few important drawbacks.

In particular, the anchoring devices, i.e. ropes and mooring springs, are difficult to adjust and, therefore, if not well held, they can enable the floating object to move considerably relatively to the anchor structure and may, therefore, cause damage to the floating object and/or the anchor structure.

In addition, the well-known anchoring devices have constant stiffness and damping features that often vary with weather conditions, aging, corrosion, etc.

In this context, the technical task underlying this invention is to devise an anchoring device capable of substantially overcoming at least some of the above-mentioned drawbacks.

As part of said technical task an important purpose of the invention is to obtain an anchoring device that is easy to adjust and that, therefore, enables the accurate anchoring of the floating object to the anchor structure.

The technical task and the specified purposes are achieved by means of an anchoring device as claimed in appended claim 1. Examples of preferred embodiments are described in the dependent claims.

The characteristics and advantages of the invention are clarified by the following detailed description of preferred embodiments thereof, with reference to the accompanying drawings, wherein.

Figure 1:
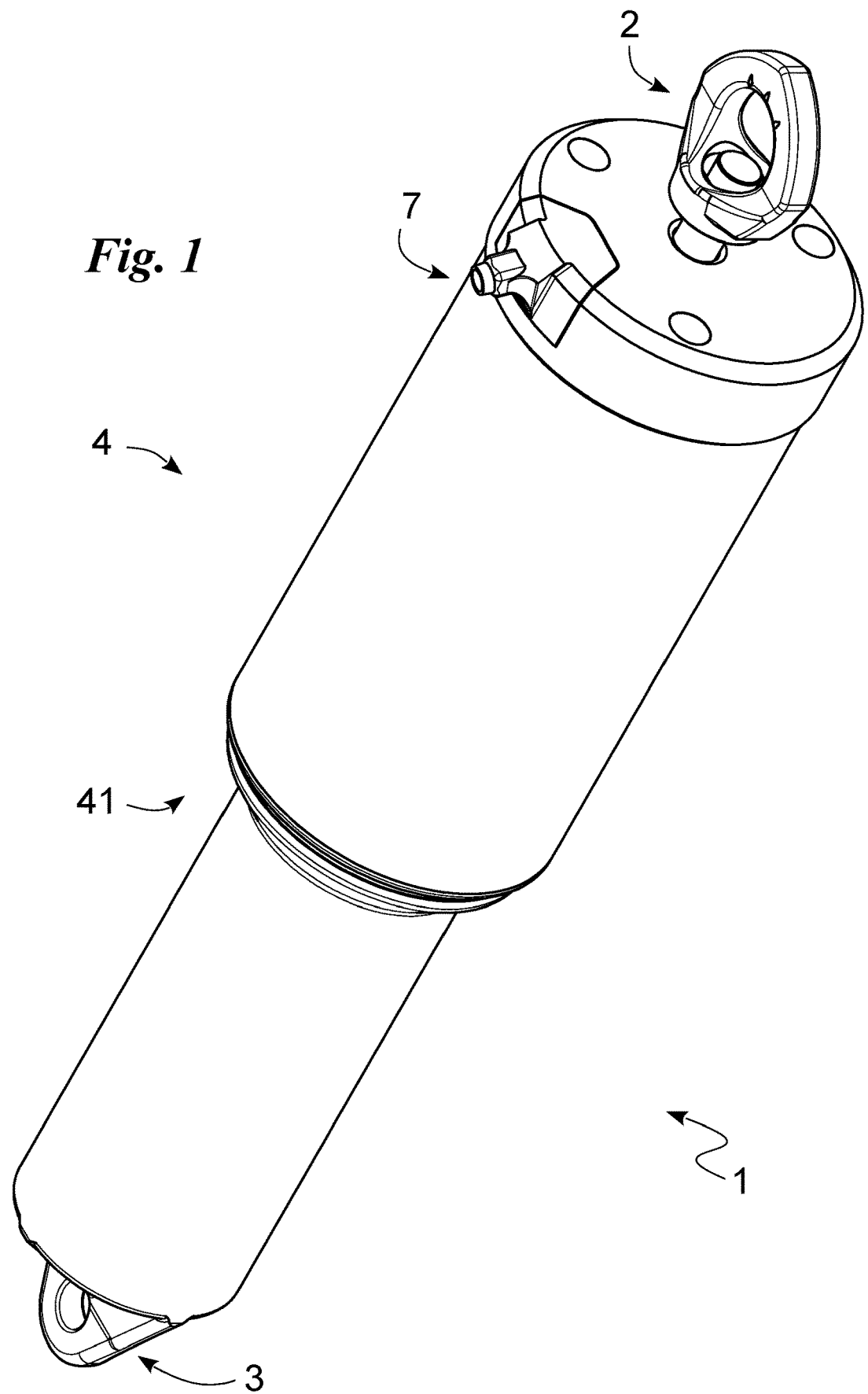
FIG. 1 shows, in scale, an anchoring device according to the invention.

In this document, the measures, values, shapes, and geometric references (such as perpendicularity and parallelism), when associated with words like "about" or other similar terms such as "approximately" or "substantially", are to be understood as except for measurement errors or inaccuracies owing to production and/or manufacturing errors and, above all, except for a slight divergence from the value, measure, shape, or geometric reference with which it is associated. For example, these terms, if associated with a value, preferably indicate a divergence of not more than 10% of the value.

Furthermore, when used, terms such as "first", "second", "higher", "lower", "main", and "secondary" do not necessarily identify an order, a priority relationship, or a relative position, but can simply be used to more clearly distinguish between the different components.

The measurements and data provided in this text are to be considered as performed in ICAO International Standard Atmosphere (ISO 2533), unless otherwise indicated. Unless otherwise indicated, as evidenced by the discussions below, it should be understood that terms such as "processing", "computer", "computing", "evaluation", or the like, refer to the action and/or processes of a computer or similar electronic calculation device, which handles and/or processes data represented as physical, such as electronic sizes of logs of a computer system and/or their memories, other data similarly represented as physical quantities inside computer systems, logs or other information storage, transmission or display devices.

With reference to the figures, the number 1 indicates, as a whole, the anchoring device according to the invention.

It is suitable for securing a floating object (such as a boat or a buoy) to an anchor structure (floating or attached to the ground) allowing a relative motion between the floating object and the anchor structure.

The anchoring device 1 comprises a first attachment 2 suitable for being secured to the floating object; and a second attachment 3 suitable for being secured to the anchor structure.

The first attachment 2 can be secured to the floating object by means of ropes or other suitable connection means, such as chains, metal cables, rods, or shackles (hereinafter called, collectively, ropes). Alternatively, it can be secured to the floating object.

The second attachment 3 can be secured to the anchor structure by means of ropes. Alternatively, it can be firmly secured to the anchor structure.

Said attachments 2 and 3 define fastenings that can be done and undone.

The anchoring device 1 comprises a damping member 4 for the relative motion between the attachments 2 and 3 and, therefore, between the floating object and the anchor structure.

The damping member 4 comprises a slide chamber 41 defining a slide axis 4a; a piston 42 suitable for sliding, along said axis 4a, in the slide chamber 41 according to a relative motion between the attachments 2 and 3; and at least one damper 43 suitable for damping the sliding of the piston 42 in the slide chamber 41.

The piston 42 is attached to one of attachments 2 or 3, in particular, to the first attachment 2.

The slide chamber 41 is attached to an attachment 2 or 3 that is separate from that of the piston 42, and preferably to the second attachment 3.

The slide chamber 41 can define a watertight internal volume. The piston 41 has its head inside the internal volume and the stem partially protruding from it through a hole equipped with sealing means.

The sliding of the piston 42 and, therefore, the position of the piston 42 defines a contracted configuration for the damping member 4, wherein the distance between the attachments 2 and 3 is minimum, and an expanded configuration, wherein the distance between the attachments 2 and 3 is maximum.

The damping member 4 may, conveniently, comprise elastic means 44 suitable for working in opposition to a variation in the distance between the attachments 2 and 3 and, in particular, to a transition from the contracted to the expanded configuration. The damping member 4 may comprise at least one kinematic mechanism 45 suitable for kinematically connecting the piston 42 and damper 43. The member 4 conveniently comprises a kinematic mechanism for the damper 43.

The kinematic mechanism 45 is a gearing suitable for transforming the rectilinear motion of the piston 42 into a rotary motion at the damper 43.

The kinematic mechanism 45 can be conveniently fixed in relation to the transmission.

It may comprise a rack 45$a$ extending along the slide axis 4$a$; and a toothed wheel 45$b$ suitable for sliding along the rack 45$a$.

The rack 45$a$ can be attached to the piston 42.

It should be obvious, for a person skilled in the art, how to replace the rack with a worm screw or a ball screw.

The toothed wheel 45$b$ can be attached to the slide chamber 41 and can be controlled in rotation by the rack 45$a$.

The kinematic mechanism 45 can comprise a multiplier 45$c$ suitable for multiplying the rotation speed of the rotor, enabling the transition from low speeds, typical of a wave, to a higher speed motion.

The damping member 4 preferably comprises at least one electric damper 43. Said damper 43 is an electric motor suitable for dissipating energy by opposing a reciprocal rotation between stator 43$a$ and rotor 43$b$. In particular, the damper 43 is a brushless electric motor.

It should be noted that said electric motor, i.e. the damper 43, can be used to produce energy by exploiting the sliding of the piston 42.

The damper 43 is attached to the chamber 41.

The damping member 4 conveniently comprises several dampers 43 that can be controlled by said at least one toothed wheel 45$b$. More conveniently, the damping member 4 comprises several dampers 43 each of which can be controlled by a toothed wheel 45$b$; and, in particular, three dampers 43 and three toothed wheels 45$b$, each of which actuates a damper 43.

Figure 2:
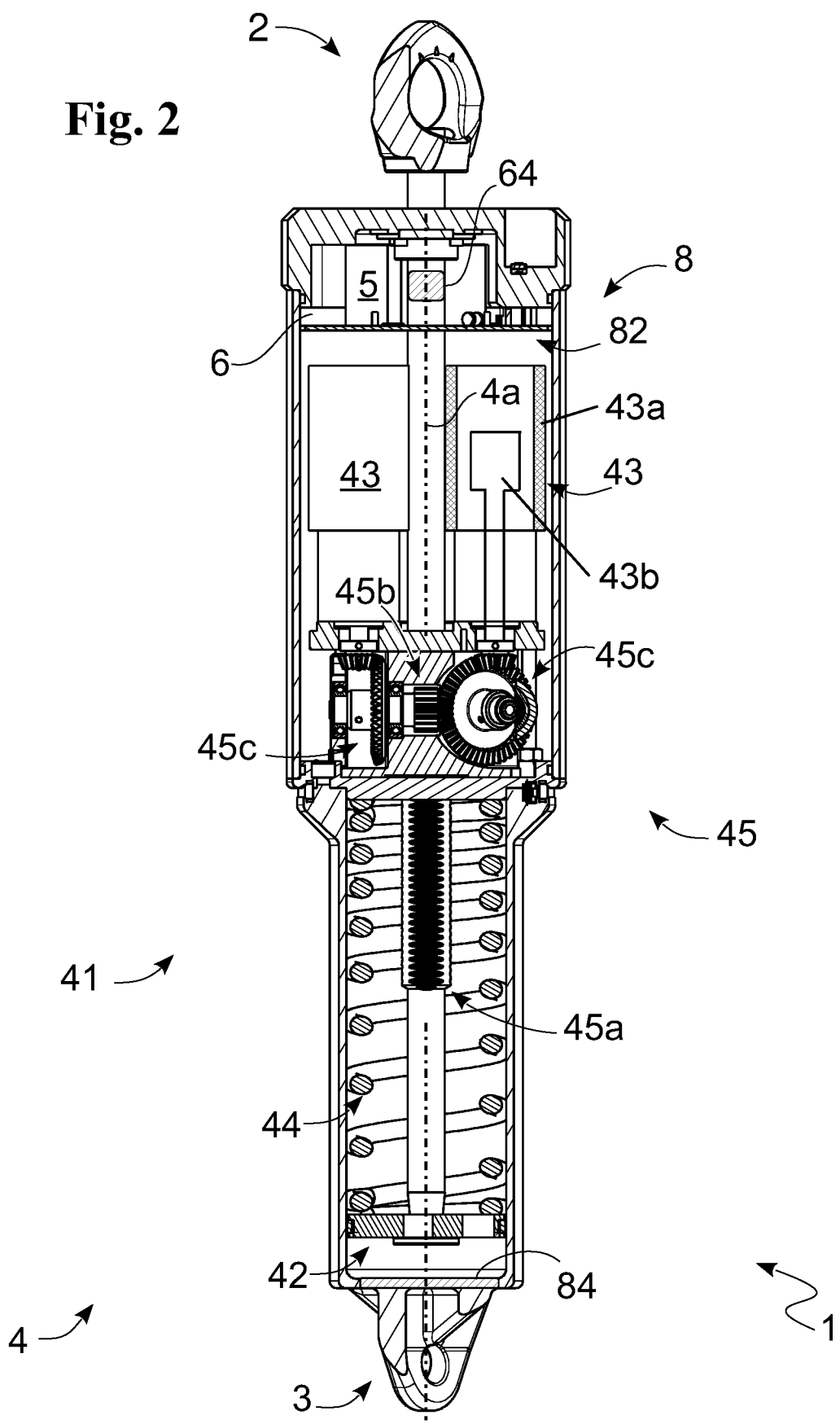
FIG. 2 shows, in scale, a cross-section of FIG. 1.
Figure 3:
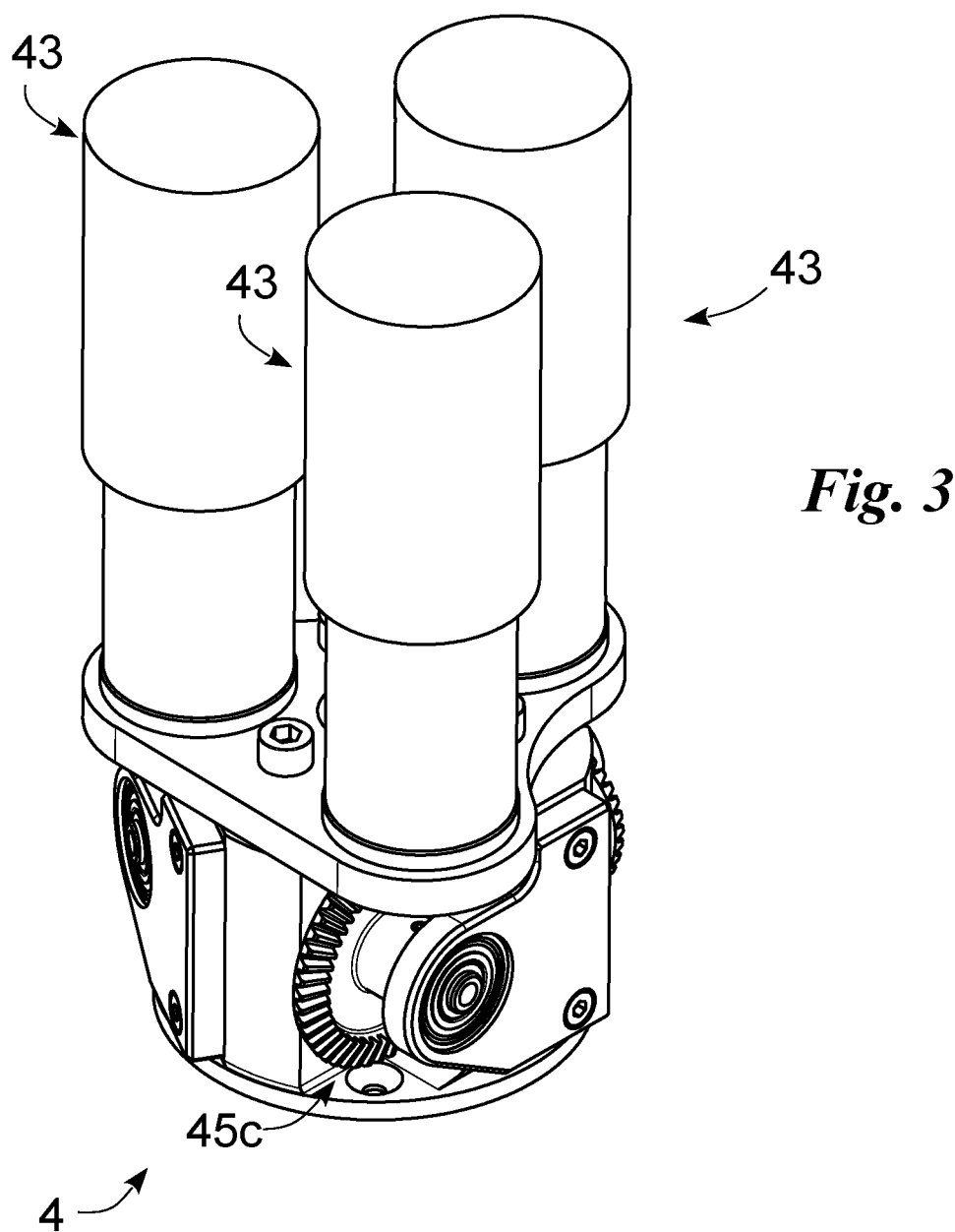
FIG. 3 shows, in scale, an assembly of the anchoring device.

An example of a damping member 4 and, in particular, of the anchoring device 1 is described in EP2705272 in paragraphs, included for reference, [0015]-[0108] and in FIGS. 1-18, included for reference.

The anchoring device 1 may comprise at least one electrical energy converter 5.

The converter 5 is suitable for varying the parameters of the electricity output from the damper 43 allowing the use of an external device and/or the same device 1.

At least one converter 5 is located in said internal volume.

The anchoring device 1 may comprise at least one energy storage battery 6 for the output from the converter 5 and/or the damper 43.

The battery 6 is located in said internal volume.

Optionally, the anchoring device 1 can comprise 7 connectors suitable for allowing the electrical connection of an external unit to the device.

The connectors are external to the volume and in electrical connection with the battery 6 and/or the converter 5.

The anchoring device 1 may comprise a control unit 8 for the operation of the same device 1.

The control unit 8 may comprise at least one measurement sensor 81 for measuring the sliding of the piston 42.

In particular, the at least one measurement sensor 81 is suitable for measuring at least one of the following: speed (in module and, conveniently, towards) and acceleration (in module and, conveniently, towards) of the sliding of the piston 42. More specifically, the sensor is suitable for measuring speed and acceleration.

At least one measurement sensor 81 may be suitable for measuring the sliding of the piston 42 in a direct manner. It can thus carry out a direct measurement of the sliding of the piston 42 by measuring its movement and/or position (e.g. a variation in position) along the slide axis 4$a$. The at least one measurement sensor 81 can measure the rotation of the toothed wheel 45$b$ and/or a variation in distance between the piston head 42 and a base of the slide chamber 41.

The unit conveniently has a sensor 81 for each toothed wheel 45$b$.

As an alternative or addition, the at least one measurement sensor 81 can carry out an indirect measurement of the sliding of the piston 42 by measuring the operating parameters of the damper 43. For example, the at least one measurement sensor 81 can measure the rotation speed of the rotor of the damper 43.

The control unit 8 may comprise a control board 82 of the anchoring device 1.

The control board 82 is in data connection with the damper 43 and, conveniently, with the converter 5 and/or battery 6 so as to monitor the production and status of the electrical energy.

The control board 82 is in data connection with the one or more sensors present in the device 1. In particular, the control board 82 is in data connection with the measurement sensor 81.

The control board 82 may be suitable for varying the damping of the damper 43 according to the sliding of the piston 42 measured by the measurement sensor 81. More specifically, the board 82 varies the damping of the damper 43 based on the speed and/or acceleration of the piston 42. Even more specifically, the control board 82 varies the damping of the damper 43 in accordance with, preferably proportionally to, the speed and/or acceleration of the piston 42.

It should be noted that in this document the expression "based on" identifies that a variation and, for example, an increase of a first parameter (in this case, the sliding speed of the piston 42) corresponds to any variation (increase or decrease) of the second parameter (in this case, the damping); the expression "in accordance with" identifies that an increase or decrease of a first parameter corresponds, respectively, to an increase or decrease of the second parameter.

The control board 82 varies the damping of the damper 43 by changing the magnetic parameters of the poles at the stator and/or rotor so as to vary the opposition to the rotation of the rotor. More specifically, the board controls 82 variations in parameters such as polarity, magnetic intensity, and electrical load circuit mode.

The control board 82 is suitable for maintaining the sliding speed of the piston 42 between a minimum speed and a maximum speed. Therefore, if, for example, the sliding speed of the piston 42 is greater than the maximum speed, the control board 82 controls an increase in damping and, therefore, the damper 43 more strongly opposes the sliding of the piston 42 which slows down.

The minimum speed is substantially less than 0.06 m/s and, more specifically, substantially between 0.06 m/s and 0.01 m/s and, preferably, between 0.05 m/s and 0.03 m/s. It is, conveniently, substantially equal to at least 0.04 m/s.

The maximum speed is substantially greater than 0.04 m/s and, more specifically, substantially between 0.1 m/s and 0.04 m/s and, preferably, between 0.07 m/s and 0.05 m/s. It is, conveniently, substantially equal to at least 0.06 m/s.

The control unit 8 may comprise at least one first force sensor 83 suitable for measuring the force that the floating object applies to the first attachment 2.

The control board 82 can, therefore, based on a variation in force at said first sensor 83, measure variations in external load (for example, due to a wave or wind) on the floating object.

The control unit 8 may comprise at least one second force sensor 84 suitable for measuring the force applied by the anchor structure to the second attachment 3.

In the same way, the control board 82 can, therefore, based on a variation of force at said second sensor 84, measure variations in the external load on the anchor structure due, for example, to movements of the floating object with respect to the anchor structure.

The control board 82 can vary the damping of the damper 43 based on and preferably in accordance with, preferably proportionally to, said measurements of the one or more force sensors 83 and 84.

The control unit 8 may comprise a monitoring system for the damper 43 suitable for measuring the parameters of the damper's operation 43.

The monitoring system may be suitable for measuring the temperature of the damper 43.

The monitoring system may be suitable for measuring the electrical current parameters (such as amperage and/or voltage) at the output of the damper 43.

The control unit 8 may comprise at least one environmental sensor set, in data connection with the control board 82, suitable for measuring environmental parameters external to the anchoring device 1.

The control unit 8 may comprise a first wave motion characterization sensor set. Said first sensor set may comprise one or more first environmental sensors, each of which is suitable for identifying the characteristics of the waves, such as the modulus and direction of the current, the height and frequency of the waves.

Based on the data collected by said first sensor set, the control board 82 may vary the damping of the damper 43. The control board 82 preferably varies the damping of the damper 43 in accordance with, preferably proportionally to, the data collected by the first sensor set.

The control unit 8 may comprise a second sensor set for characterising the water conditions. Said second sensor set may comprise one or more second environmental sensors, each of which is suitable for measuring at least one water parameter that can be chosen from: temperature, clarity, presence of pollutants in the water, salinity, depth, and presence of fish.

The control unit 8 may comprise a third air characterization sensor set. Said third sensor set may comprise one or more third environmental sensors, each of which is suitable for measuring one or more air parameters such as temperature, exposure to light, presence of pollutants in the air, modulus and wind direction.

It should be noted that the various sensors of said sensor sets are known in and of themselves.

Finally, the control unit 8 may comprise a distance gauge.

More specifically, the control unit 8 may comprise a first distance gauge for gauging the distance between the anchoring device 1 and the floating object; and a second distance gauge for gauging the distance between the anchoring device 1 and the anchor structure.

The control unit 8 may comprise a geo-localiser suitable for identifying the position of the anchoring device 1.

The anchoring device 1 may comprise data connection means suitable for allowing a data exchange, preferably a wireless one (using WI-FI, Bluetooth and LoRa), between the control unit 8 and an external unit suitable for monitoring, thanks to the reception of the parameters collected by the control unit 8, the operation of the device 1.

The operation of the anchoring device 1 described above in a structural sense, is as follows.

To begin with, the anchoring device 1 is secured, through the first attachment 2, to the floating object (e.g. a boat or a vessel) and, through the second attachment 3, to an anchor structure.

When, due to the wave motion, there is a relative motion between the floating object and the anchor structure that, by moving the attachments 2 and 3 together, causes a sliding of the piston 42 along the slide axis 4a, then, the damper 43 is actuated to attenuate the motion between the floating object and the anchor structure.

More specifically, the motion of the piston 42 causes the rack 45a to slide, resulting in a rotation of the toothed wheel 45b that, through a kinematic connection mechanism, activates the damper 43, causing the rotor to rotate.

This rotation of the rotor, due to the poles present on the stator, results in both a slowing down of the sliding of the piston, attenuating the motion between the floating object and the anchor structure, and a production of electrical energy that can be used to operate the device 1 and/or to supply an external device.

Where the control board 82, thanks to the measurement sensor 81, measures the speed of the piston 42 as higher than the maximum speed or lower than the minimum speed, the same control board 82 controls, respectively, an increase or a decrease of the damping of the damper 43 bringing the speed of the piston 42 within the desired range.

The anchoring device 1 according to the invention achieves important advantages. In fact, thanks to the measuring sensor 81 and, therefore, the control board 82, it is able to monitor the operation of the damper 43. In particular, the anchoring device 1, by acting on the damping, is able to vary the sliding speed of the piston 42 and, consequently, to have a basic adaptive behaviour based on the sea conditions.

In fact, by varying the sliding speed of the piston 42 based on the sliding of the piston 42 and, therefore, based on the wave motion, the device can easily adapt the speed of the damper (i.e. of the rotor) keeping it within a range of maximum efficiency of electricity production.

In addition, this capacity allows the anchoring device 1 to smoothly oscillate regardless of the state of the sea and wind.

It should be noted that this aspect is further accentuated by the presence of force sensors 83 and 84 that, by providing additional information to the control board 2, allow a more optimal control of the anchoring device 1 and, therefore, of its oscillations.

One advantage owes to the presence of the data connection means that, by sending the data collected by the control unit 8 to an external unit, allow to remotely monitor the operation of the anchoring device 1 (allowing, for example, a preventive maintenance) and/or allow to know, for example, the presence and status of a floating object anchored to the device 1 or a trend history of the wave motion, the state of the sea, etc.

The invention is subject to variations falling within the scope of the inventive concept defined by the claims. In this context all the details may be replaced with equivalent elements and the materials, shapes and dimensions may be as desired.

The invention claimed is:

1. An anchoring device for anchoring a floating object to an anchor structure comprising:
   a first attachment suitable for being secured to said floating object;
   a second attachment suitable for being secured to said anchor structure;
   a damping member for damping the relative motion between said attachments and suitable for securing said first attachment to said second attachment and comprising:
      a slide chamber,
      a piston suitable for sliding in said slide chamber according to a relative motion between said attachments and
      at least one damper suitable for damping the sliding of said piston in said slide chamber; and
   a control unit for said anchoring device comprising:
      a measurement sensor for measuring at least one of a speed or an acceleration of the sliding of said piston, and
      a control board suitable for varying the damping of said at least one damper according to said at least one of the speed or the acceleration of the sliding of said piston detected by said measurement sensor in order to maintain the speed of the piston between a minimum speed and a maximum speed;
   wherein said damper is used to produce energy by exploiting the sliding of the piston and said damper is an electric motor that comprises a stator and a rotor and being an electric motor suitable for dissipating energy by opposing a reciprocal rotation between said stator and said rotor; and
   wherein said control board varies the damping of said damper by changing magnetic parameters of the poles at said stator and/or said rotor so as to vary the opposition to the rotation of said rotor.

2. The anchoring device according to claim 1, wherein said damping member comprises at least one kinematic mechanism suitable for kinematically connecting said piston to said damper;
   said kinematic mechanism comprises a rack, a toothed wheel suitable for sliding along said rack when said piston slides in said slide chamber; and
   wherein said measurement sensor measures the rotations of said toothed wheel to calculate said sliding of the piston detected by said measurement sensor in order to maintain the speed of the piston between the minimum speed and the maximum speed.

3. The anchoring device according to claim 1, wherein said at least one damper is a brushless electric motor that comprises a stator and a rotor; wherein said piston controls the rotation of said rotor when said piston slides in said slide chamber and wherein said measurement sensor measures the rotations of said rotor in order to calculate said sliding of said piston.

4. The anchoring device according to claim 1, wherein said control unit comprises at least one of a first force sensor suitable for measuring a force applied by said floating object to said first attachment and a second force sensor suitable for measuring the force applied by said anchor structure to said second attachment.

5. The anchoring device according to claim 1, wherein said control unit comprises a first sensor set for characterizing a wave motion, which is suitable for measuring at least one of the following: the modulus of a current, a direction of said current, a height of the waves, and a frequency of said waves.

6. The anchoring device according to claim 1, wherein said control unit comprises a second sensor set for characterizing the conditions of the water, which is suitable for measuring at least one of the following: a temperature of said water, a clarity of said water, a presence of pollutants in said water, a salinity of said water, a depth of said water and a presence of fish in said water.

7. The anchoring device according to claim 1, wherein said control unit comprises a third sensor set for characterizing an air, which is suitable for measuring at least one of the following: a temperature of said air, a light exposure of said anchoring device, a presence of pollutants in said air, a modulus and direction of a wind of said air.

8. An anchoring device for anchoring a floating object to an anchor structure, the anchoring device comprising:
   a first attachment suitable for being secured to said floating object;
   a second attachment suitable for being secured to said anchor structure;
   a damping member for damping the relative motion between said attachments and suitable for securing said first attachment to said second attachment and comprising:
      a slide chamber,
      a piston suitable for sliding in said slide chamber according to a relative motion between said attachments, and
      at least one damper suitable for damping the sliding of said piston in said slide chamber; and
   a control unit for said anchoring device comprising:
      a measurement sensor for measuring at least one of the following speed or acceleration of the sliding of said piston, and
      a control board suitable for varying the damping of said at least one damper according to said sliding of said piston detected by said measurement sensor for maintaining the sliding speed of the piston between a minimum speed and a maximum speed;
   wherein said at least one damper is used to produce energy by exploiting the sliding of the piston and said at least one damper is a brushless electric motor that comprises a stator and a rotor and being an electric motor suitable for dissipating energy by opposing a reciprocal rotation between said stator and said rotor; and
   wherein said control board varies the damping of said at least one damper by changing magnetic parameters of the poles at said stator and/or said rotor so as to vary the opposition to the rotation of said rotor.

9. The anchoring device according to claim 8, wherein said control board is adapted and configured to vary the polarity, magnetic intensity, and electrical load circuit mode.

10. The anchoring device according to claim 8, wherein said measurement sensor is adapted and configured to measure said speed and acceleration of the sliding of said piston.

* * * * *